UNITED STATES PATENT OFFICE 2,279,318

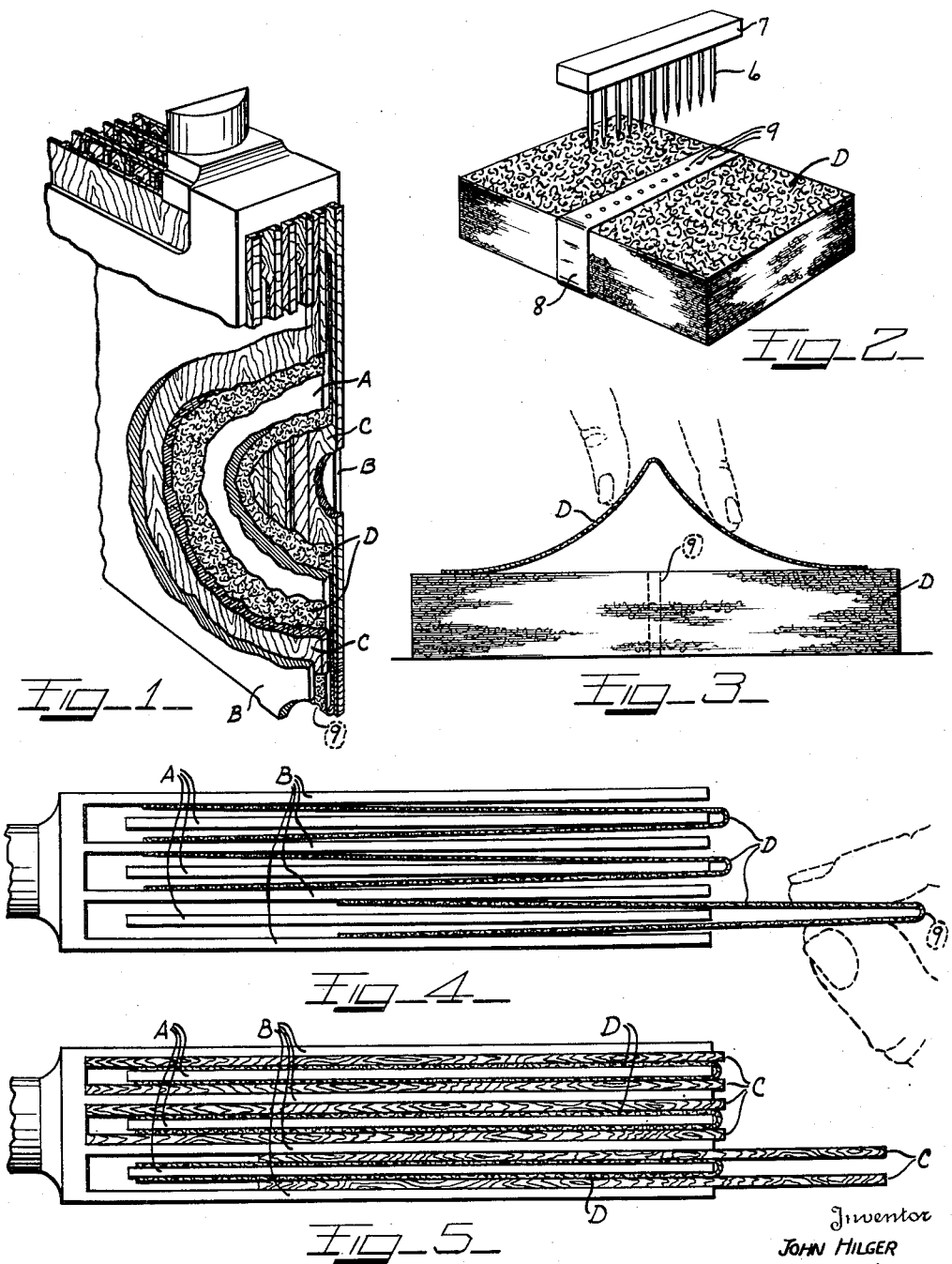

BATTERY

John Hilger, Milwaukee, Wis., and James F. Macholl, Los Angeles, Calif., assignors, by mesne assignments, to Owens-Corning Fiberglas Corporation, Toledo, Ohio, a corporation of Delaware Original application October 31, 1940, Serial No. 363,662. Divided and this application March 20, 1941, Serial No. 384,332

3 Claims. (Cl. 136—146)

This invention relates to storage batteries, and the main object is to provide a battery current producing unit possessing certain novel and important characteristics including the use of fiber glass retention mats, so formed and inserted as to efficiently retain the active material in the positive grid plates while also not interfering with the required flow or circulation of battery fluid.

The method employed in the practice of our invention forms the subject of our copending application Serial No. 363,662, filed October 31, 1940, of which the present application is a division. The claims of this application are primarily directed to the novel structural characteristics and features of the battery unit, as distinguished from the method, per se. Yet it is deemed necessary to briefly consider the precedent circumstances as well as our improved method in explaining the present invention.

Battery manufacturers are generally cognizant of the advantages flowing from the use of spun or fibered glass retention mats, and batteries utilizing the same are now available to the public. In brief, such mats, placed against both sides of the positive plates, function to trap the loosened particles of active material and hold them to the plate surface so as to prevent their falling to the cell bottom, while also being porous enough to permit the free vertical flow of battery fluid. This retention of the oxide keeps a maximum quantity thereof in service at all times and thereby extends the life of the battery and maintains its capacity at a high point of efficiency. It is also found that these mats also offer additional protection against short circuits.

The principal objection to the use of these mats resides in the difficulty of handling them and in properly inserting them in the plate assembly. If it is attempted to simply insert the mats edgewise between the spaced battery plates, either with or separately from the insertion of the separators, it is found that they are not only difficult to handle but that they will wrinkle, buckle, or break, thus leaving parts of the plates exposed and increasing the mat thickness over other areas, or the mats will, even if properly maintained as units, be hard to properly locate with respect to the area of active material, and the incorrect placement thus results in substantial waste of material, particularly at what later becomes the upper edge of the plates as the mats are inserted between the under edges and are moved until they meet stops beyond the upper edges of the plates.

Attempts have been made to overcome these difficulties by securing the mats to the adjacent faces of the wood separators, so that the two can be inserted as one unit and with the relatively more rigid wood separators keeping the mats stretched and straight while they move into position. This process, while used in the industry, is objectionable for various reasons and particularly because of the time, labor, and expense required in gluing or otherwise tacking the mats and separators together. This method is also objectionable in that it requires insertion of the separator-mat units in the plate assembly shortly after the separators and mats have been secured together. The reason for this is that the required pre-soaking of the wood separators causes them to expand and if the glass mats are secured thereto while in that condition the units must be inserted before any contractions of the separators (by drying) and resulting wrinkling of the mats takes place, all of which circumstances preclude the possibility of preparing and storing the separator-mat units for future use and much in advance of the insertion step of that method.

By way of overcoming the foregoing objections to other methods and to greatly facilitate the accurate placement of mats in the battery we have developed a method or process which will now be described and which is illustrated in the accompanying drawing, wherein—

Fig. 1 is a perspective elevation of a battery cell plate group which has been constructed in accordance with our invention, with fractional portions broken away.

Fig. 2 is a perspective view of a package of glass fibre mats as prepared for shipment and perforated for subsequent use in our improved method.

Fig. 3 is a side elevation of a package such as shown in Fig. 2, but with the retention band removed and illustrating how the top sheets are successively removed by the operator when inserting them in the plate group unit.

Fig. 4 is a plan view of a plate group unit when resting on one side edge, as is done for this operation in the battery assembly line, and this view illustrates the method step of inserting the folded glass fiber mats.

Fig. 5 is similar to Fig. 4 except that it illustrates the succeeding step of inserting the separator plates.

The battery parts illustrated include the positive plates A and the negative plates B alternately arranged and mounted in relatively rigid relationship in the plate group in conventional manner; C designates the wood separators, placed between adjacent plates A and B and having a vertically corrugate face on the positive plate side.

The fiber glass mats, designated by the letter D, are not cut to the shape and size of the plates A—B as is done in the previously described methods, but as shown in Figs. 2 and 3, are cut in sheets just twice the required size, so that when the sheets are doubled across the center, and folded together they can be slipped over the positive battery plates as shown best in Fig. 4. When the wood separators are then inserted, as indicated in Fig. 5, they will not wrinkle or displace the mats, but rather the slight frictional face contact will tend to smoothen out the mats and properly move them into place, it being understood that the creased or joined edges of the mats will stop against the edges of the embraced positive plates as they can go no further. In fact, with such positive stop means for properly positioning the mats it is possible to have them pre-cut to such dimensions that they need not even extend to the upper edge extremity of the positive plates but can be terminated slightly short thereof and at the level of the upper limits of the active material retained within the plate. Thus, we obtain maximum efficiency from the mat material while also obtaining maximum economy in the amount of fiber glass material required.

It will thus be seen that the use of folded double size mats, inserted in advance of the separators, eliminates displacement and wrinkling, and results in accurate placement and smoothening by the separators, thus greatly simplifying the previously described methods and resulting in marked advantages thereover.

Even our folding and inserting operation, however, gives rise to certain difficulties, and, as additional features of our invention we have found ways of overcoming these difficulties as well. Thus if the double size glass sheet is to be accurately folded in the middle equipment must be provided either to mechanically fold the sheet or to guide the operator in doing so. Furthermore, mere folding per se is insufficient, at least unless the sheet is then also immediately inserted, because the glass fiber used in this mat material has a decided tendency to spring back to its initial position, or unfold; and if sufficient creasing pressure is applied to really maintain the fold then it is found that such pressure will have broken the relative brittle glass fibers and then the two mat sections of the sheet will no longer hand together. It is also found that the characteristics of this particular material render it extremely difficult to handle in sheet form by mechanical means. It is further found that if the material is to be folded by hand it cannot be pre-scored to aid the operator without breaking the fibers and separating the two mats.

We have, however, discovered that if the glass fiber sheets are perforated centrally, i. e., in the line of the fold, then such perforations will weaken the total tensile strength of the sheets on the fold line to such an extent that accurate folding is obtainable but without so breaking down the texture as to prevent the creased edge of the doubled sheet from properly engaging the positive plate to hold the mats while the separators are being inserted. The performating process may consist of actually removing or punching out material to leave a row of holes, but we have found it sufficient, and in fact, preferable to punch the holes by merely piercing the mat package with a series of tines such as indicated at 6 in Fig. 2, these tines or pointed pins being secured in a block 7 mounted for vertical reciprocation in a punching machine of any suitable design. In this way a large number of mats can be perforated at one time and as shown in Fig. 2 the perforating operation can be effected without even removing the paper band 8 by which the mats are held together and in which they are received from the fiber glass processing factory. It will, of course, be understood that when the mats are to be perforated the package will be placed against suitable guides or stops in the punching machine so that the row of holes 9 will form an accurate division line midway between and parallel with the end edges of the sheets. Obviously a large supply of mats can be perforated far in advance of use, if desired, and it may here further be noted that this method of defining and weakening the fold line is accomplished far more economically and efficiently than scoring (assuming that to be otherwise practicable) because of the necessity, in scoring, of handling and operating on the sheets singly.

The operation of actually folding and inserting the mats is simple, yet effective and highly satisfactory. The plate group units are brought to the operator's table resting on one side edge, and with the alternate positive and negative plates secured in equally spaced parallel positions, as indicated in Fig. 4, and the package of double length put pre-perforated mats, from which the band 8 has been removed, is then placed in a convenient position on the work support so that the operator can pick up one mat at a time, from the top of the supply, as indicated in Fig. 3 and while doing so also folds the mat in two. While so holding it he then inserts it over a positive plate of the group unit, as shown in Fig. 4, and when the mats have all been inserted he, or another operator, then inserts the separator plates, as shown in Fig. 5, to complete the unit which then embodies the assembly characteristics more clearly evidenced by Fig. 1. As previously explained the inserting of the separator plates frictionally contacts the mats to move them accurately into final position, and under no circumstances causes wrinkling or shifting of the mats as has occurred heretofore.

It will be understood that suitable modifications may be made in the practice of this invention without departing from the spirit and scope of the appended claims. Having now, therefore, fully illustrated and described the preferred embodiment of our invention and the method of practicing the same in the practical art, what we desire to protect by Letters Patent and claim as our invention is:

1. A mat for one positive plate of a storage battery and for retaining active material in the positive plate of the storage battery comprising a rectangular sheet of porous fiber glass material having an area substantially twice that of the plate and folded in such manner as to cover both faces of the plate, said mat being pre-perforated along the fold line to facilitate accurate folding into double wall formation.

2. In a battery having alternately arranged positive and negative plates secured together in spaced parallel planes and separated by intermediate insulation plates, fiber glass oxide retention mats disposed between the positive plates and said insulation plates, said mats being in pairs with a pair for each positive plate and with the mats of each pair formed from a continuous sheet pre-perforated and folded at its middle to extend under one edge of a positive plate and thence upwardly over opposite face areas thereof.

3. An oxide retention element for a single positive plate of a battery comprising a sheet of porous fiber glass material having an area substantially double that of the plate and having its tensile strength weakened by perforations along a fold line intermediate its end edges whereby the sheet may be accurately folded to form connected mats of equal size to cover opposite faces of the plate.

JOHN HILGER.
JAMES F. MACHOLL.